United States Patent [19]
Yamaki

[11] Patent Number: 5,917,871
[45] Date of Patent: Jun. 29, 1999

[54] BIT SYNCHRONIZATION CIRCUIT AND METHOD CAPABLE OF CORRECT BIT SYNCHRONIZATION FOR BOTH 2-VALUE AND 4-VALUE FSK TRANSMISSION SIGNALS

[75] Inventor: Yoichi Yamaki, Kanagawa, Japan

[73] Assignee: Matsushita Electric Industrial Co., Ltd., Osaka, Japan

[21] Appl. No.: 08/791,825

[22] Filed: Jan. 30, 1997

[51] Int. Cl.⁶ ........................................................ H04L 7/06
[52] U.S. Cl. ............................ 375/364; 375/335; 329/303
[58] Field of Search ..................................... 375/316, 334, 375/354, 335, 362, 364; 340/825.44; 329/300–303

[56] References Cited

U.S. PATENT DOCUMENTS

| | | | |
|---|---|---|---|
| 5,155,446 | 10/1992 | Eberle et al. ............................. | 329/300 |
| 5,371,899 | 12/1994 | Kuznicki et al. ....................... | 455/34.1 |
| 5,635,914 | 6/1997 | Petreye et al. ....................... | 340/825.44 |
| 5,677,681 | 10/1997 | Tanaka et al. ....................... | 340/825.21 |
| 5,781,588 | 7/1998 | Abe et al. ................................. | 375/334 |

FOREIGN PATENT DOCUMENTS

Hei. 4-177937  6/1992  Japan .

Primary Examiner—Tesfaldet Bocure
Assistant Examiner—Bryan Webster
Attorney, Agent, or Firm—Pearne, Gordon, McCoy & Granger LLP

[57] ABSTRACT

A bit synchronization circuit receives polarity-judged output signal and a level-judged output signal that are produced through demodulation of a 2-value FSK or 4-value FSK transmission signal. Flip-flop circuits and an exclusive-OR circuit generate a second sampling output by sampling and delaying the polarity-judged output signal. Flip-flop circuits and an exclusive-NOR circuit generate a third sampling signal having a given temporal relationship with the second sampling output by sampling and delaying the level-judged output signal. AND circuits supply a correction signal to a counter circuit when levels of the second and third sampling outputs and a phase signal indicating a correction period of the counter circuit satisfy a given relationship. In response to the correction signal, the counter circuit corrects its count so as to produce a clock signal having a rate that is equal to a transmission rate of the transmission signal.

14 Claims, 9 Drawing Sheets

FIG. 11
PRIOR ART

# BIT SYNCHRONIZATION CIRCUIT AND METHOD CAPABLE OF CORRECT BIT SYNCHRONIZATION FOR BOTH 2-VALUE AND 4-VALUE FSK TRANSMISSION SIGNALS

BACKGROUND OF THE INVENTION

1. Field of the Invention

The present invention relates to a bit synchronization circuit of a selective calling receiver which circuit performs bit synchronization upon reception of a transmission signal that is modulated according to 2-value or 4-value FSK.

2. Description of the Related Art

Figure 7:
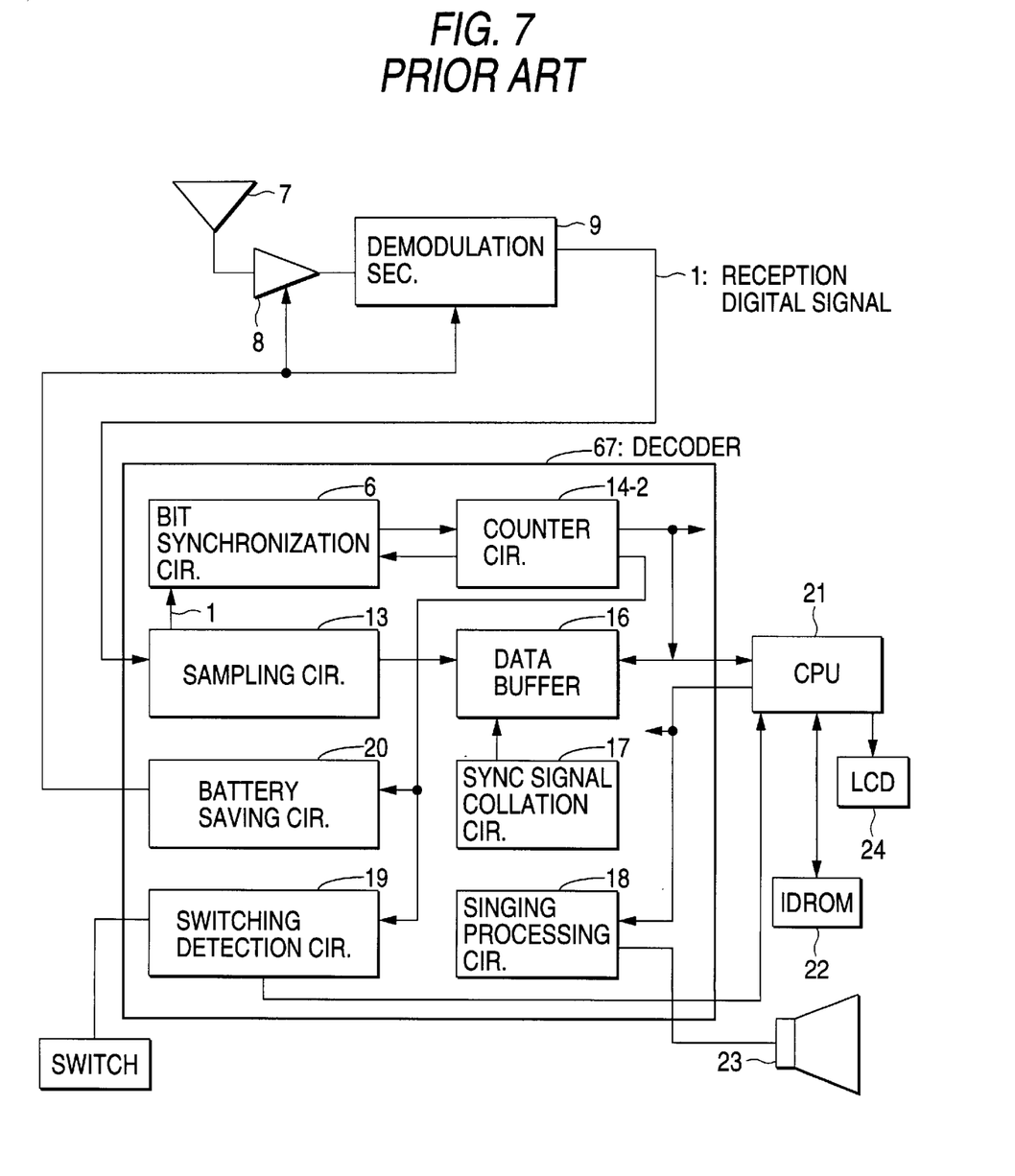
FIG. 7 is a block diagram showing the entire configuration of a conventional selective calling receiver.
Figure 8:
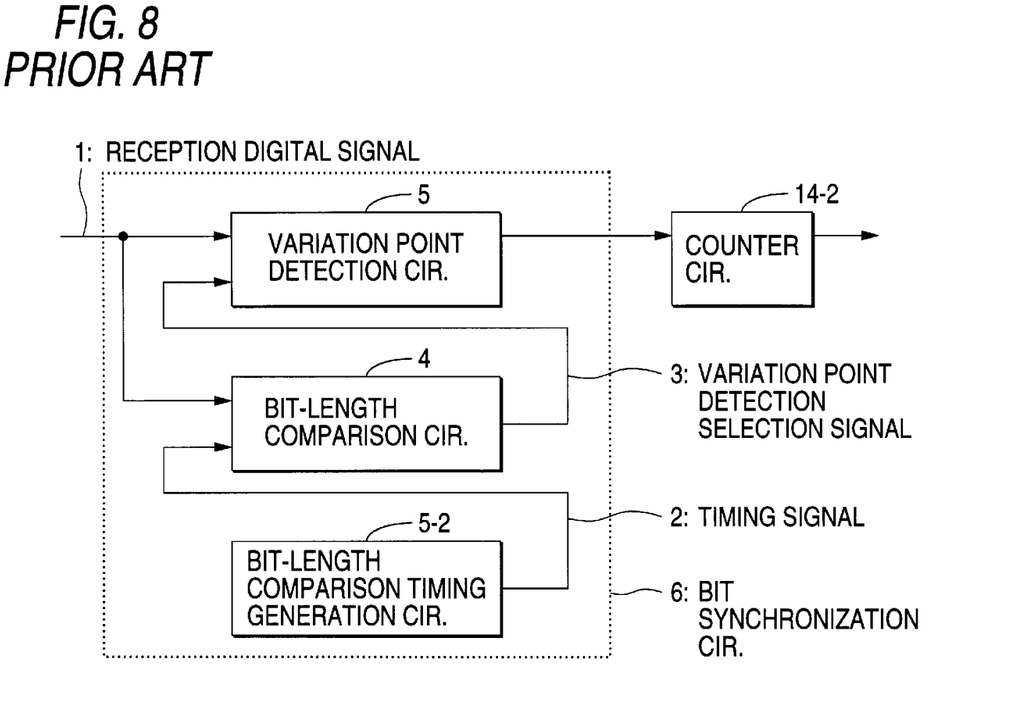
FIG. 8 is a block diagram showing a detailed configuration of a bit synchronization circuit used in the receiver of FIG. 7.

Conventionally, in receiving the above type of digital transmission signal, bit synchronization is performed to correctly identify each bit of the received digital transmission signal. FIGS. 7 and 8 respectively show examples of a selective calling receiver and a bit synchronization circuit used therein according to the prior art. The bit synchronization circuit of FIG. 8 is disclosed in Japanese Unexamined Patent Publication No. Hei. 4-177937.

FIG. 7 is a block diagram showing the entire configuration of a conventional selective calling receiver, and FIG. 8 is a block diagram showing a detailed configuration of a bit synchronization circuit used in the receiver of FIG. 7. First, the configuration of the conventional selective calling receiver will be described with reference to FIG. 7. In FIG. 7, an antenna 7 receives a signal transmitted from a base station. An amplifier 8 amplifies the transmission signal received by the antenna 7. A demodulation section 9 demodulates the transmission signal, which is modulated according to 2-value FSK, and produces a reception digital signal 1. The reception digital signal 1, which is equivalent to a polarity-judged output signal (described later), is, for instance, a binary signal that has a logic value "1" when a received transmission signal crosses level f0 (described later) upward and has a logic value "0" when it crosses level f0 downward.

A sampling circuit 13 samples the binary reception digital signal 1 and produces transmission data or information. A data buffer 16 temporarily stores the transmission data thus obtained. A bit synchronization circuit 6 detects variation points of the reception digital signal 1 received via the sampling circuit 13. (The bit synchronization circuit 6 will be described in detail with reference to FIG. 8.) A counter circuit 14-2 detects the bit rate of the transmission signal by counting variation points of the reception digital signal 1, and corrects a clock signal to be used for internal processing so that it conforms to the bit rate of the transmission signal.

A sync signal collation circuit 17 confirms reception of a frame by collating a frame sync signal contained in the transmission data stored in the data buffer 16 with that retained by itself. A singing processing circuit 18 performs calling notification (the notification may be made in any form such as output of a singing) in response to an instruction from a CPU 21 upon reception of a calling number of the receiver itself (hereinafter referred to as "self calling number"). A singing is generated by a speaker 23. A switching detection circuit 19 detects on/off switching of a switch, such as a push-button switch, which is used for, for instance, acknowledgment of a singing.

A battery saving circuit 20 turns on power to be supplied to the amplifier 8 and the demodulation section 9 when there is a possibility that the receiver receives its own calling number. (Reception of the self calling number can be predicted from received transmission frame numbers, because the receiver is assigned its own transmission frame number.) Further, the battery saving circuit 20 turns off the power to the amplifier 8 and the demodulation circuit 9 when there is no possibility of receiving the self calling number. A decoder 67 is constituted of the above-mentioned bit synchronization circuit 6, counter circuit 14-2, sampling circuit 13, data buffer 16, sync signal collation circuit 17, singing processing circuit 18, switching detection circuit 19, and battery saving circuit 20.

A CPU 21 controls the entire selective calling receiver including the decoder 67. For example, the CPU 21 collates a received calling number temporarily stored in the data buffer 16 with the self calling number stored in an IDROM 22. When finding their coincidence, the CPU 21 instructs the singing processing circuit 18 and a LCD 24 to generate a singing and display an image, respectively. As mentioned above, the IDROM stores the self calling number. A display device (simply called "LCD") displays received information by using a liquid crystal display, for instance.

Next, the operation of the conventional selective calling receiver will be described still with reference to FIG. 7. A 2-value FSK signal transmitted from a base station is received by the antenna 7, amplified by the amplifier 8, and demodulated by the demodulation section 9, which outputs a binary reception digital signal 1 to the decoder 67. The sampling circuit 13 of the decoder 67 samples the reception digital signal 1, and outputs resulting transmission data to the data buffer 16 for temporary storage thereof.

On the other hand, the bit synchronization circuit 6 detects variation points of the reception digital signal 1 received via the sampling circuit 13 (or directly). (This operation will be described in detail with reference to FIG. 8.) Informed of the detected variation points, the counter circuit 14-2 counts those points to detect a bit rate of the transmission signal. The counter circuit 14-2 corrects a clock signal that is used for internal processing so that it conforms to the bit rate of the transmission signal.

The sync signal collation circuit 17 collates a frame sync signal that is stored in the data buffer 16 with the frame sync signal retained by the sync signal collation circuit 17. When it is confirmed that a frame has been received, the sync signal collation circuit 17 continues to store transmission data ensuing the frame sync signal in the data buffer 16, and informs the CPU 21 of the reception of the transmission data and causes the data buffer 16 to output the transmission data to the CPU 21. The CPU 21 collates a calling number contained in the transmission data with the self calling number stored in the IDROM 22. When finding their coincidence, the CPU 21 instructs the singing processing circuit 18 and the LCD 24 to generate a singing and display received information, respectively.

Next, with reference to FIG. 8, a detailed description will be made of the configuration of the conventional bit synchronization circuit 6 used in the selective calling receiver of FIG. 7. In FIG. 8, a bit-length comparison timing generation circuit 5-2 generates a timing signal 2 indicating a 1-bit length of 1,600 bps, when a reception digital signal 1 one is obtained from a signal modulated at 1,600 bps, for instance. A bit-length comparison circuit 4 compares the bit length of the timing signal 2 with that of the reception digital signal 1, and produces a variation point detection selection signal 3 indicating, by "on" or "1", that the reception digital signal 1 is one obtained from a signal modulated at 1,600 bps. A variation point detection circuit 5 detects bit variation points of the reception digital signal 1 when the variation point detection selection signal 3 is "on." The counter circuit 14-2, which is the same one shown in FIG. 7, is informed of the detected variation points.

Next, the operation of the conventional bit synchronization circuit 6 will be described with reference to FIG. 8. Where the selective calling receiver is so set as to receive a 2-value FSK transmission signal that is modulated at 1,600 bps, a timing signal 2 indicating the 1-bit length of 1,600 bps is generated. The bit-length comparison circuit 4 compares the bit length of the timing signal 2 with that of a reception digital signal 1, to check whether the reception digital signal 1 is one obtained from a signal modulated at 1,600 bps. If the result is affirmative, the bit-length comparison circuit 4 produces a variation point detection selection signal 3 of "on."

The variation point detection circuit 5 detects variation points of the reception digital signal 1 only when the variation point detection selection signal 3 is "on." The counter circuit 14-2 is informed of the detected variation points. The counter circuit 14-2 counts the variation points based on a reference clock signal, and thereby detects the bit rate of the received transmission signal. Further, the counter circuit 14-2 corrects a clock signal that is used for internal processing of the selective calling receiver so that it conforms to the bit rate of the transmission signal.

As described above, in the bit synchronization circuit of the conventional selective calling receiver, when a transmission signal modulated according to 2-value FSK is to be received, variations from 0 to 1 or 1 to 0 of a reception digital signal as a demodulation signal of the transmission signal. The counter circuit corrects a clock signal so as to produce a proper internal clock signal that conforms to the detected timing.

In recent years, to accommodate rapidly increasing demand for receivers of the above kind, 4-value FSK comes to be used for modulation of a transmission signal. However, the following problems occur if, for instance, a bit synchronization circuit similar to the above-described conventional bit synchronization circuit that is used to demodulate a transmission signal modulated according to 2-value FSK is used to demodulate a transmission signal modulated according to 4-value FSK.

Figure 9:
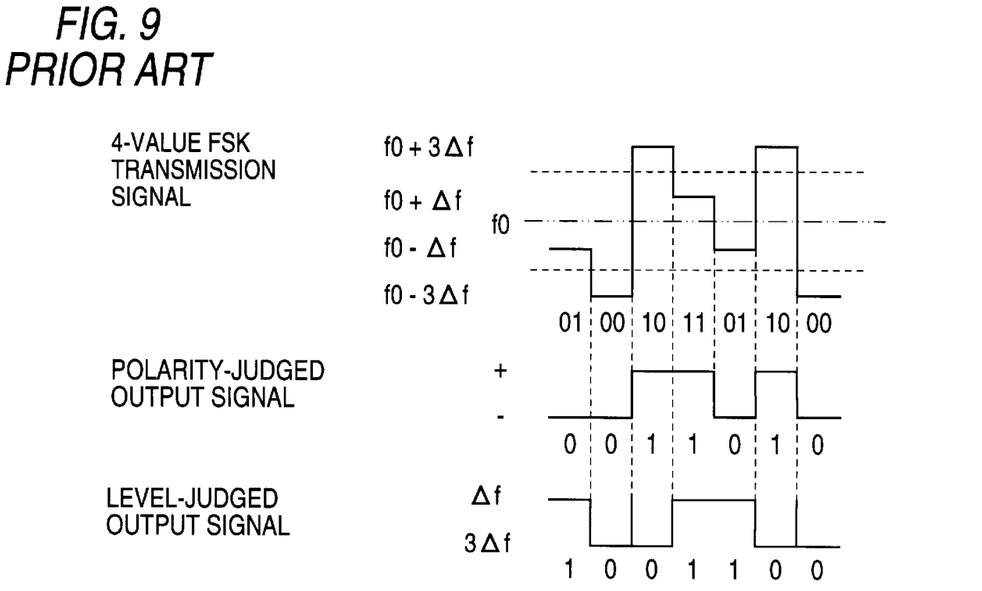
FIG. 9 is a timing chart showing a transmission signal modulated according to 4-value FSK, an output signal obtained by polarity-judging it, and a level-judged output signal
Figure 10:
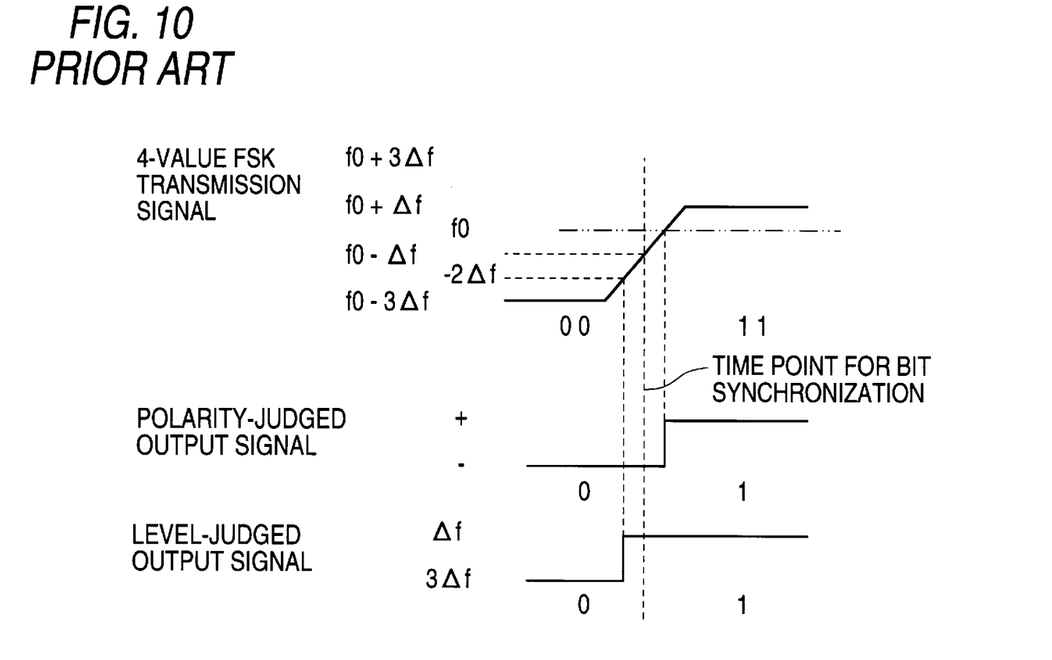
FIG. 10 is a timing chart showing a transmission signal modulated according to 4-value FSK and changing from "00" to "11," an output signal obtained by polarity-judging it, and a output signal obtained by level-judging it.
Figure 11:
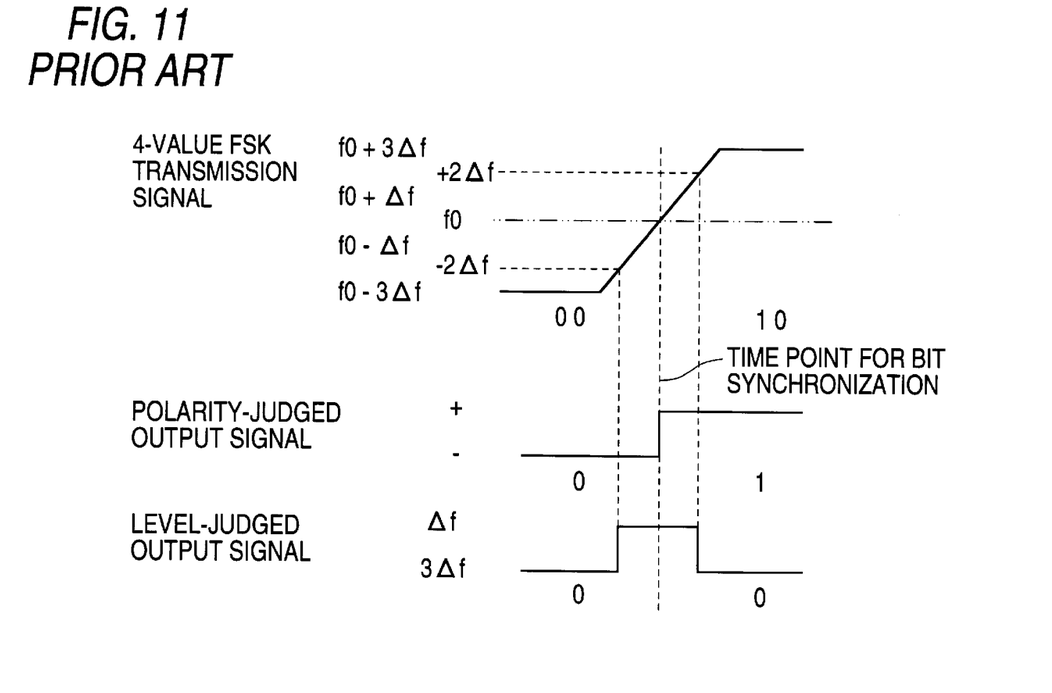
FIG. 11 is a timing chart showing a transmission signal modulated according to 4-value FSK and changing "00" to "10," an output signal obtained by polarity-judging it, and an output signal obtained by level-judging it.

Referring to FIGS. 9–11, a description will now be made of problems that are associated with a case where a transmission signal modulated according to 4-value FSK is demodulated by the prior art technique. FIG. 9 is a timing chart showing a transmission signal modulated according to 4-value FSK, an output signal obtained by polarity-judging it, and a level-judged output signal. FIG. 10 is a timing chart showing a transmission signal modulated according to 4-value FSK and changing from "00" to "11," an output signal obtained by polarity-judging it, and an output signal obtained by level-judged it. FIG. 11 is a timing chart showing a transmission signal modulated according to 4-value FSK and changing "00" to "10," an output signal obtained by polarity-judging it, and an output signal obtained by level-judging it.

The bit values of a 4-value FSK transmission signal change among "00," "01, " "10," and "11" as shown in FIG. 9. The demodulation section demodulates a 4-value FSK signal of 4 levels by dividing it into two kinds of 2-value FSK signals, and produces a polarity-judged output signal and a level-judged output signal by detecting variations in the level of each of the two 2-value FSK signals.

Where a transmission signal varies between level $+3\Delta f$ and level $-3\Delta f$ with level f0 being the center as shown in FIG. 9, the level of a polarity-judged output signal is inverted when the transmission signal crosses level f0 as shown in FIGS. 10 and 11. The level of a level-judged output signal is inverted between $\Delta f$ and $3\Delta f$ when the transmission signal crosses level $f0+2\Delta f$ or $f0-2\Delta f$.

In the above prior art technique, in dealing with a transmission signal modulated according to 2-value FSK, the counter circuit corrects a clock signal by detecting variations in the state of a polarity-judged output signal (i.e., a reception digital signal) that is obtained by detecting variations in the polarity of the transmission signal. However, in dealing with a transmission signal modulated according to 4-value FSK, bit synchronization needs to be effected by detecting variation in the states of two binary output signals obtained by demodulating, i.e., dividing the transmission signal. However, there has not yet been developed any device which can effect bit synchronization on a transmission signal modulated according to 4-value FSK. The following problems occur if the prior art technique is applied to such a transmission signal.

For example, when the bit values of a transmission signal change from "00" to "11" as shown in FIG. 10, the level of the transmission signal changes from $f0-3\Delta f$ to $f0+\Delta f$. The polarity of a polarity-judged output signal to be used for bit synchronization varies being deviated (i.e., varies when level f0 is crossed) from a time point when bit synchronization should be effected (i.e., the center of the varying portion of the waveform). Thus, bit synchronization is effected at proper timing.

A pulse occurs in a binary level-judged output signal that is obtained from a transmission signal modulated according to 4-value FSK when the transmission signal changes between level $f0-2\Delta f$ and level $f0+2\Delta f$. For example, when the bit values of a transmission signal change from "00" to "10" as shown in FIG. 11, the level of the transmission signal changes from $f0-3\Delta f$ to $f0+3\Delta f$. Since the transmission signal changes to cover the range of $f0-2\Delta f$ to $f0+2\Delta f$, a pulse is generated in the level-judged output signal, whereby a value "1", is output which has not been transmitted. That is, a pulse erroneously occurs in the level-judged output signal even at a level variation point or a crossing point of the transmission signal where a pulse should not occur. Bit synchronization would be effected erroneously based on the erroneously generated level-judged output signal.

SUMMARY OF THE INVENTION

An object of the present invention is, therefore, to provide a selective calling receiver having a bit synchronization circuit in which no deviation occurs in effecting bit synchronization on each of a transmission signal modulated according to 2-value FSK and that modulated according to 4-value FSK, and which can perform bit synchronization correctly without causing an event that bit synchronization is effected erroneously based on an erroneously generated output signal.

A bit synchronization circuit and method according to the invention use a polarity-judged output signal produced by detecting polarity variations in a demodulated signal of a transmission signal that is modulated according to 2-value FSK or 4-value FSK and a level-judged output signal produced by detecting level variations in the demodulated signal. A second sampling output is generated by sampling and delaying a variation in the state of the polarity-judged output signal, at a time point when a half symbol length or a half bit length has elapsed from sampling of a variation in the state of the level-judged output signal. A third sampling output is generated by further delaying the variation in the state of the level-judged output signal by the half symbol length or the half bit length. A correction signal is supplied to a counter circuit when all of the second and third sampling outputs and a phase signal indicating a period during which the count of the counter circuit needs to be corrected are turned on. In response to the correction signal, a number corresponding to an integral multiple of a reference clock period is added to or subtracted from the count of the counter circuit so that a clock signal that is output from the counter circuit has a rate equal to a transmission rate of the transmission signal.

The invention provides a selective calling receiver having a bit synchronization in which correct bit synchronization is always effected on both of a 2-value FSK and 4-value FSK signal, that is, no erroneous bit synchronization is effected due to a deviated output signal. The bit synchronization circuit of the invention has an additional advantage of simple configuration.

DESCRIPTION OF THE PREFERRED EMBODIMENTS

Embodiments of the present invention will be hereinafter described in detail with reference to FIGS. 1–6.

Figure 1:
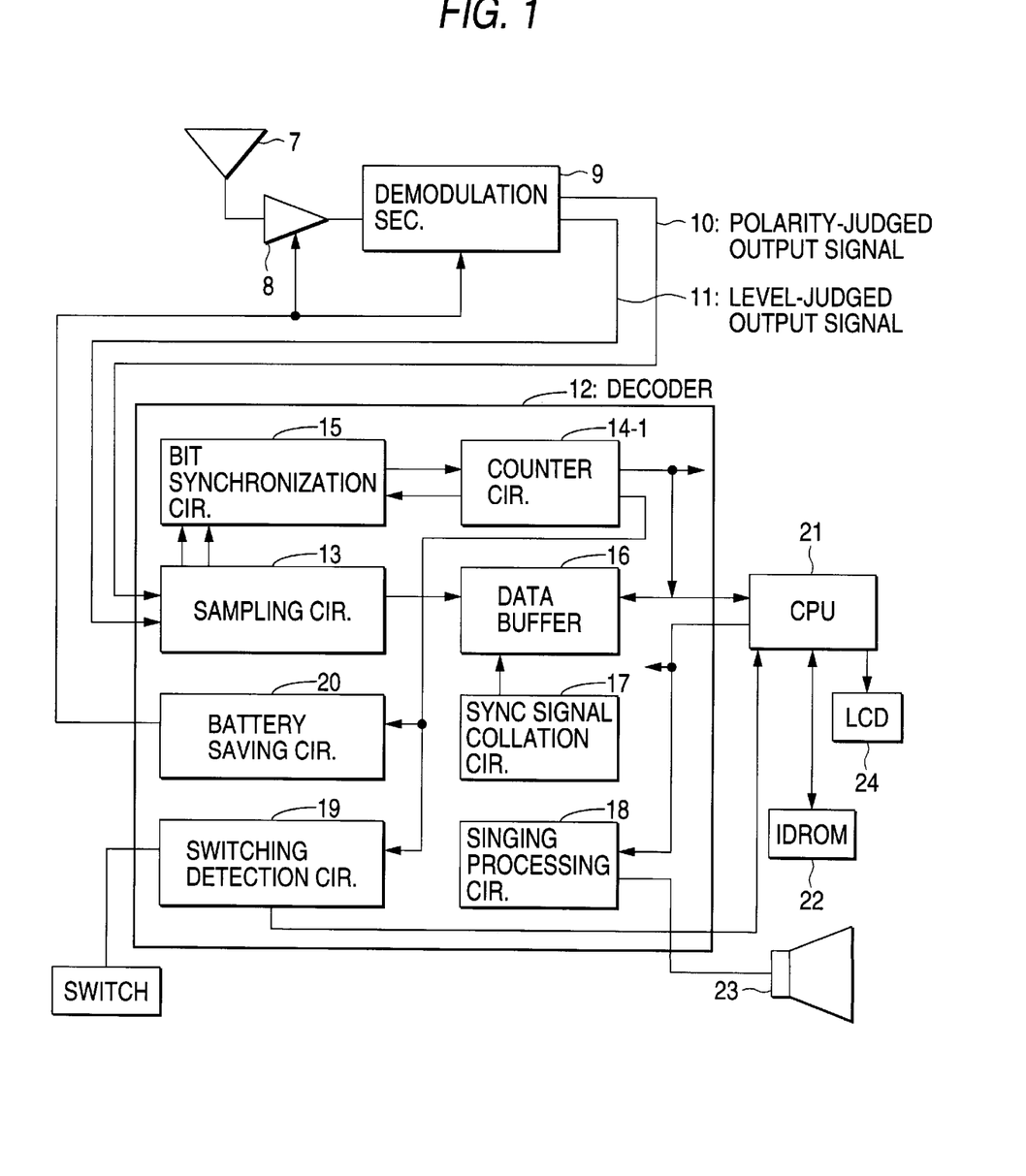
FIG. 1 is a block diagram showing the configuration of a selective calling receiver having a bit synchronization circuit according to each embodiment of the present invention.

First, the configuration of a selective calling receiver having a bit synchronization circuit according to each embodiment will be described with reference to FIG. 1. In FIG. 1, an antenna 7 receives a signal transmitted from a base station. An amplifier 8 amplifies the transmission signal received by the antenna 7. A demodulation section 9 demodulates the transmission signal, which is modulated according to 2-value FSK or 4-value FSK. That is, the demodulation section 9 converts the transmission signal into two binary signals, i.e., a polarity-judged output signal 10 and a level-judged output signal 11.

Figure 3:
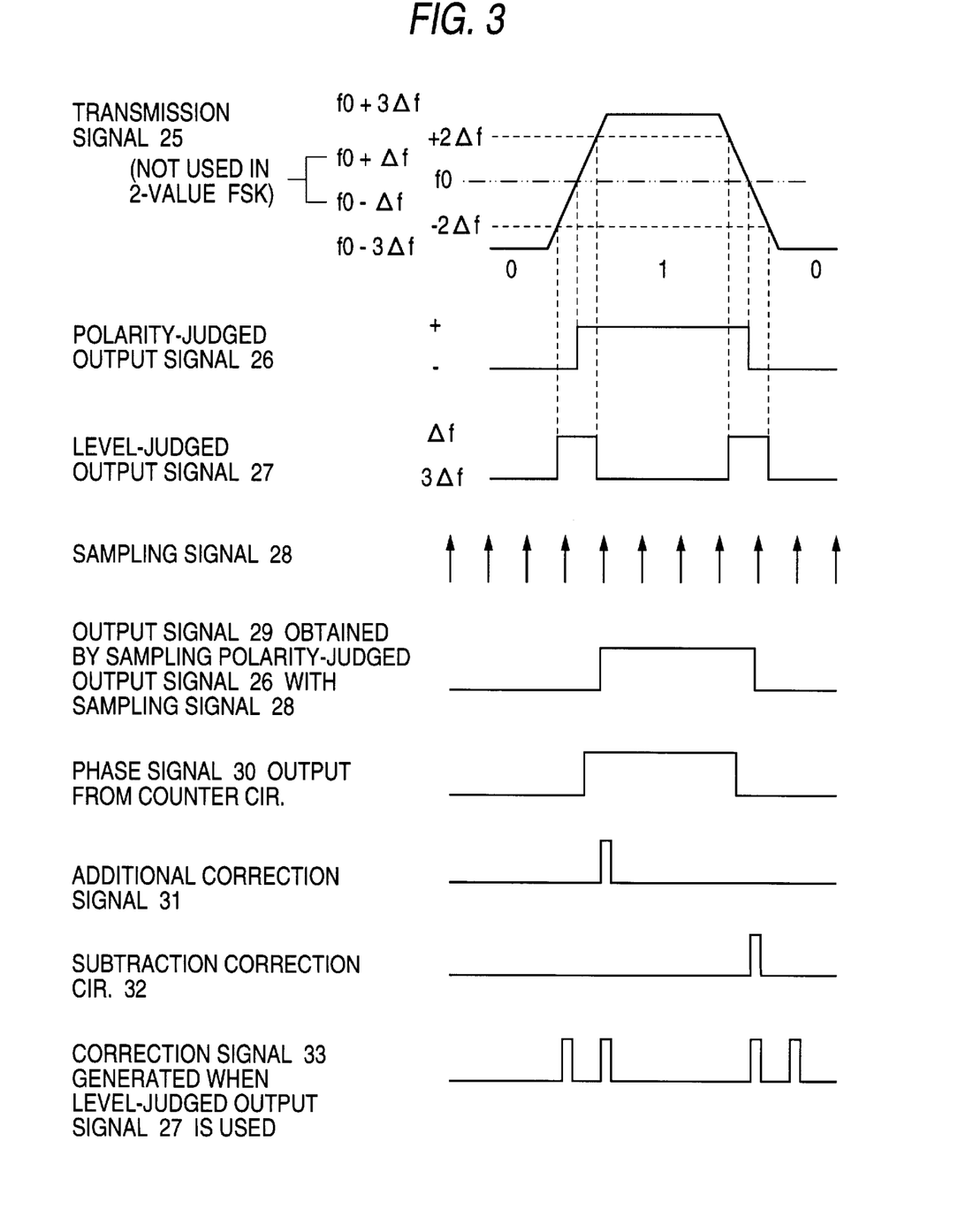
FIG. 3 is a timing chart showing an operation of the bit synchronization circuit of FIG. 2.

Referring to a transmission signal 25 shown in FIG. 3, the level of the polarity-judged output signal 10 is inverted when the transmission signal 25 crosses level f0. The level-judged output signal 11 is at level Δf (high level) when the transmission signal 25 is within the range between f0−2Δf and f0+2Δf, and is at level 3Δf (low level) when the transmission signal is smaller than f0−2Δf or larger than f0+2Δf.

A sampling circuit 13 supplies a bit synchronization circuit 15 with a sampling signal 28 for sampling at a rate that is four or five times higher than a transmission rate, as well as samples the received binary polarity-judged output signal 10 and level-judged output signal 11 and produces transmission data or information.

A data buffer 16 temporarily stores the transmission data thus obtained. A bit synchronization circuit 15 detects variation points of the polarity-judged output signal 10 and the level-judged output signal 11 received via the sampling circuit 13 (or directly from the inputs of a decoder 12), and produces an addition correction signal 31 or a subtraction correction signal 32 (see FIG. 2) to be used for bit synchronization. (The bit synchronization circuit 15 will be described in detail with reference to FIGS. 2 and 3.)

A counter circuit 14-1 corrects a clock signal, which is generated by counting reference clocks, to be used for internal processing so that it conforms to the bit rate of a transmission signal (for instance, 1,600 bps) by increasing or decreasing the counting period in accordance with the addition correction signal 31 or the subtraction correction signal 32 received from the bit synchronization circuit 15, that is, by increasing or decreasing the counting period by an integral multiple of the reference clock period. For example, when receiving the addition correction signal 31, the counter circuit 14-1 elongates the period of the clock signal from 48 times the reference clock period to 50 times the reference clock period.

A sync signal collation circuit 17 confirms reception of a frame by collating a frame-sync signal contained in the transmission data stored in the data buffer 16 with that retained by itself. A singing processing circuit 18 performs calling notification (the notification may be made in any form such as output of a singing) in response to an instruction from a CPU 21 upon reception of a calling number of the receiver itself (hereinafter referred to as "self calling number"). A singing is generated by a speaker 23. A switching detection circuit 19 detects on/off switching of a switch, such as a push-button switch, which is used for, for instance, acknowledgment of a singing.

A battery saving circuit 20 turns on power to be supplied to the amplifier 8 and the demodulation section 9 when there is a possibility that the receiver receives its own calling number. (Reception of the self calling number can be predicted as already explained above.) Further, the battery saving circuit 20 turns off the power to the amplifier 8 and the demodulation circuit 9 when there is no possibility of receiving the self calling number. A decoder 12 is constituted of the above-mentioned bit synchronization circuit 15, counter circuit 14-1, sampling circuit 13, data buffer 16, sync signal collation circuit 17, singing processing circuit 18, switching detection circuit 19, and battery saving circuit 20.

A CPU 21 controls the entire selective calling receiver including the decoder 12. For example, the CPU 21 collates a received calling number temporarily stored in the data buffer 16 with the self calling number-stored in an IDROM 22. When finding their coincidence, the CPU 21 instructs the singing processing circuit 18 and a LCD 24 to generate a singing and display an image, respectively. As mentioned above, the IDROM stores the self calling number. A display device (simply called "LCD") displays received information by using a liquid crystal display, for instance.

Next, the operation of the selective calling receiver of each embodiment will be described still with reference to FIG. 1. A 2-value or 4-value FSK signal transmitted from a base station is received by the antenna 7, amplified by the amplifier 8, and demodulated by the demodulation section 9, which outputs binary polarity-judged output signal 10 and level-judged output signal 11 to the decoder 12.

The sampling circuit 13 of the decoder 12 samples the polarity-judged output signal 10 and the level-judged output signal 11, and outputs resulting transmission data to the data buffer 16 for temporary storage thereof. The operation of sampling the output signals 10 and 11 will not be described further, because it is not the subject matter of the invention.

On the other hand, the bit synchronization circuit 15 detects variation points of the polarity-judged output signal 10 and the level-judged output signal 11 received via the sampling circuit 13 (or directly from the inputs of the decoder 12). (This operation will be described later in detail.) The bit synchronization circuit 15 supplies the counter circuit 14-1 with an addition correction signal 31 or a subtraction correction signal 32 (see FIG. 2).

The counter circuit 14-1 corrects a clock signal, which is generated by counting reference clocks, so that it conforms to the bit rate of a transmission signal (for instance, 1,600 bps) by increasing or decreasing the counting period in accordance with the addition correction signal 31 or the subtraction correction signal 32 received from the bit synchronization circuit 15, that is, by increasing or decreasing the counting period by an integral multiple of the reference clock period. For example, when receiving the addition correction signal 31, the counter circuit 14-1 elongates the period of the clock signal from 48 times the reference clock period to 50 times the reference clock period. The clock signal thus generated is used for the internal processing of the selective calling receiver.

The sync signal collation circuit 17 collates a frame sync signal that is stored in the data buffer 16 with the frame sync signal retained by the sync signal collation circuit 17. When it is confirmed that a frame has been received, the sync signal collation circuit 17 continues to store transmission data ensuing the frame sync signal in the data byffer 16; and informs the CPU 21 of the reception of the transmission data and causes the data buffer 16 to output the transmission data to the CPU 21. The CPU 21 collates a calling number contained in the transmission data with the self calling number stored in the IDROM 22. When finding their coincidence, the CPU 21 instructs the singing processing circuit 18 and the LCD 24 to generate a singing and display received information, respectively. A user manipulates the switch to inform the CPU 21 of acknowledge of the calling. In response, the CPU 21 clear the respective functions and waits for next reception of a transmission signal.

Next, with reference to FIGS. 2 and 3, a description will be made of a detailed configuration and the operation of a bit synchronization circuit according to a first embodiment of the invention which is directed to reception of a 2-value FSK transmission signal.

First, the configuration of the bit synchronization circuit 15 will be described with reference to FIG. 2. (While FIG. 1 includes the block of the bit synchronization circuit 15, it is shown in detail in FIG. 2.) In FIG. 2, a polarity-judged output signal 26, which corresponds to the polarity-judged output signal 10 shown in FIG. 1, is obtained such that its level is inverted when a received transmission signal 25 that is modulated according to 2-value FSK crosses the polarity changing level (level f0). (The transmission signal 25 varies between f0−3Δf and f0+3Δf.) A sampling signal is output from the sampling circuit 13. A phase signal 30, which is output from the counter circuit 14-1, turns on and off to indicate a period during which addition or subtraction correction by the counter circuit 14-1 is needed.

Flip-flops (FFs) 61 and 62 delay variations in the state (i.e., variations in the level; this definition also applies to the following description) of the polarity-judged output signal 26 by sampling it with the sampling signal 28. Set outputs (Q) of the flip-flops 61 and 62 are input to an exclusive-OR circuit 63, which outputs "1" only when receiving inputs "0" and "1" or inputs "1" and "0." A flip-flop 68 flips the output of the exclusive-OR circuit 63 upon reception of the next reference clock 55 and supplies a Q output (first sampling output) to AND circuits 64 and 65. The flip-flop 68 is reset by the next reset signal 53 that is sent from the counter circuit 14-1. When receiving an "on" Q output of the flip-flop 68 and an "on" phase signal 30, the AND circuit 64 outputs an addition correction signal 31. The AND circuit 65 outputs a subtraction correction signal 32 when receiving an "on" Q output of the flip-flop 68 while the phase signal 30 is not on.

Next, with reference to FIGS. 2 and 3, the operation of the bit synchronization circuit 15 of the first embodiment will be described. First, the receiving section including the demodulation section 9 (see FIG. 1) converts a transmission signal 25 that is modulated according to 2-value FSK into a binary polarity-judged output signal 26 and a binary level-judged output signal 27, which are output to the bit synchronization circuit 15 (see Fig. 2). (In the modulation according to 2-value FSK, levels f0+Δf and f0−Δf are not used.)

The flip-flop 61 samples the received polarity-judged output signal 26 with the sampling signal 28, and turns on the Q output signal 29, to thereby render one input of the exclusive-OR circuit 63 in an on-state. Since the other input of the exclusive-OR circuit 63 is still off, its output is in an on-state. The "on" output of the exclusive-OR circuit 63 is supplied to the set input of the next-stage flip-flop 68, and is flipped in response to the next reference clock 55, whereby an "on" Q output of the flip-flop 68 is supplied to the AND circuits 64 and 65. The flip-flop 68 is reset by a reset signal 53 that is output from the counter circuit 14-1 after count correction therein. The flip-flop 68 is provided to prevent an event that a plurality of correction signals are produced when the polarity of the polarity-judged output signal 26 changes once.

At this time point, the phase signal 30 coming from the counter circuit 14-1 is already turned on. Since both inputs of the AND circuit 64 are on, the AND circuit 64 produces an addition correction signal 31. When the Q output signal 29 of the flip-flop 61 is turned off, the exclusive-OR circuit 63 have inputs "0" and "1." Therefore, the exclusive-OR circuit supplies "1" to the input of the flip-flop 68. The flip-flop 68 is turned on upon reception of the next reference clock 55, and it supplies an "on" Q output to the AND circuits 64 and 65. However, since the phase signal 30 coming from the counter circuit 14-1 has already been turned off at this time point, both inputs of the AND circuit 65 are on and hence the AND circuit 65 outputs a subtraction correction signal 32. In other words, when the output signal 29 obtained by sampling the polarity-judged output signal 26 with the sampling signal 28 changes from "0" to "1" or "1" to "0," the addition correction signal 31 or the subtraction correction signal 32 is produced after reference to the phase signal 30.

As described above, depending on reception of the addition correction signal 31 or the subtraction correction signal 32, the counter circuit 14-1 adds to or subtracts from the count number a number corresponding to an integral multiple of the reference clock period. After completion of the count correction, the counter circuit 14-1 produces a reset signal 53 to clear the flip-flop 68.

Next, still referring to FIGS. 2 and 3, a description will be made of a hypothetical example in which it is intended to generate the addition correction signal 31 or subtraction correction signal 32 by using variations in the state of the level-judged output signal 27 rather than the polarity-judged output signal 26 in a case where the transmission signal 25 is modulated according to 2-value FSK. In this case, the level-judged output signal 27 is generated as shown in FIG. 3. When the level-judged output signal 27 is input to the flip-flop 61, a pulse of a correction signal 33 (see FIG. 3), which corresponds to the addition correction signal 31 or subtraction correction signal 32, occurs twice during each of a rise and a fall of the transmission signal 25. Therefore, it becomes difficult to effect synchronization so that it conforms to variations in the state of the transmission signal 25.

As described above, according to the first embodiment, where a received transmission signal is modulated according to 2-value FSK, bit synchronization can correctly be performed on the transmission signal to generate clocks that are synchronized with respective bits of the transmission signal by using only the polarity-judged output signal, i.e., by detecting variations in the state thereof.

Next, with reference to FIGS. 4 and 5, a description will be made of a detailed configuration and the operation of a bit synchronization circuit 15 according to a second embodiment of the invention which is directed to reception of a 4-value FSK transmission signal.

First, the configuration of the bit synchronization circuit 15 will be described with reference to FIG. 4. (While FIG. 1 includes the block of the bit synchronization circuit 15, it is shown in detail in FIG. 4.) In FIG. 4, a polarity-judged output signal 35, which corresponds to the polarity-judged output signal 10 shown in FIG. 1, is obtained such that its level is inverted when a received transmission signal 34 (see FIG. 5) that is modulated according to 4-value FSK crosses the polarity changing level (level f0). A level-judged output signal 36 is obtained through judgment of the level of the transmission signal 34 as described above. A sampling signal 37 is output from the sampling circuit 13.

A phase signal 41, which is output from the counter circuit 14-1, indicates a period during which count correction in the counter circuit 14-1 is needed. That is, while the phase signal 41 is on, it indicates a portion where count addition is needed. While it is off, it indicates a portion where count subtraction is needed. A reset signal 54, which is generated upon completion of count correction in the counter circuit 14-1, is used to clear a flip-flop 79. Flip-flops (FFs) 71 and 72 delay variations in the state of the polarity-judged output signal 35 (from "0" to "1" or from "1" to "0") by sampling it with the sampling signal 37.

Set outputs (Q) of the flip-flops 71 and 72 are input to an exclusive-OR circuit 80, which outputs "1" only when receiving inputs "0" and "1" or inputs "1" and "0." Flip-flops (FFs) 78 and 79 samples the output of the exclusive-OR circuit 80 with the sampling signal 37, and generates an output signal 38 (called second sampling output) by delaying the polarity-judged output signal 35 by a time corresponding to 3 sampling pulses together with the flip-flops 71 and 72. The flip-flops 71, 72, 78, and 79 and the exclusive-OR circuit 80 constitute a means for generating the second sampling output.

A flip-flop (FF) 73 delays variations in the state of the level-judged output signal 36 by sampling it with the sampling signal 37, and produces an output signal 39. Flip-flops (FFs) 74–77 delay the Q output (i.e., output signal 39) of the flip-flop 73 based on the sampling signal 37, and produces an output signal 40 (5-times sampled).

The two output signals 39 and 40 are input to an exclusive-NOR circuit 81, which outputs "1" only when receiving inputs "1" and "1" or inputs "0" and "0." An AND circuit 82 produces an addition correction signal 42 when receiving an "on" output of the exclusive-NOR circuit 81, an "on" Q output signal of the flip-flop 79, and an "on" phase signal 41. An AND circuit 83 outputs a subtraction correction signal 43 when receiving an "on" output of the exclusive-NOR circuit 81 an "on" Q output signal 38 of the flip-flop 79 while the phase signal 41 is not on. The flip-flops 73-77 and the exclusive-NOR circuit 81 constitute a means for generating a third sampling output, and the AND circuits 82 and 83 constitute a means for generating a correction signal.

Next, with reference to FIGS. 4 and 5, the operation of the bit synchronization circuit 15 of the second embodiment will be described. First, the receiving section including the demodulation section 9 (see FIG. 1) converts a transmission signal 34 that is modulated according to 4-value FSK into a binary polarity-judged output signal 35 and a binary level-judged output signal 36, which are output to the bit synchronization circuit 15 (see FIG. 4). (In the modulation according to 4-value FSK, levels f0+Δf and f0−Δf are also used.) The flip-flop 71 samples the received polarity-judged output signal 35 with the sampling signal 37, and turns on its Q output signal, to thereby render one input of the exclusive-OR circuit 80 in an on-state. Since the other input of the exclusive-OR circuit 80 is still off, its output is in an on-state. The "on" output of the exclusive-OR circuit 80 renders the Q output signal 38 of the flip-flop 79 at a time point of the third sampling pulse as counted from the sampling pulse with which the flip-flop 79 performed sampling.

On the other hand, the flip-flop 73 samples the level-judged output signal 36 once with the sampling signal 37, and turns on its Q output 39, to thereby render one input of the exclusive NOR circuit 81. Since the other input of the exclusive-NOR circuit 81 is still off, the output (i.e., third sampling output) of the exclusive-NOR circuit 81 is kept off.

The Q output signal 40 of the flip-flop 77 is turned on at a time point of the fifth sampling pulse as counted from the sampling pulse with which the flip-flop 79 performed sampling. Therefore, as seen from FIG. 5, the output of the exclusive-NOR circuit 81 becomes on only between the fifth sampling pulse and the eighth sampling pulse (among the sampling pulses shown in FIG. 5). Such an output signal is input to the AND circuits 82 and 83.

As described above, when the Q output signal 38 of the flip-flop 79 is turned on, the output of the exclusive-NOR circuit 81 is also on. Since the phase signal coming from the counter circuit 14-1 has already been turned on, all the three inputs of the AND circuit 82 are on, as a result of which the AND circuit 82 produces an addition correction signal 42. That is, when the output signal 38, which is obtained by sampling the polarity-judged output signal 35 with the sampling signal 37 having a rate 4 or 5 times higher than the transmission rate, is changed from "0" to "1" and the output of the exclusive-NOR circuit 81 is on (i.e., both of the output signals 39 and 40 obtained by sampling the level-judged output signal 36 are "0" or "1"), the addition correction signal 42 is produced with a further condition that the phase signal 41 is also on (reference is made to the phase signal 41).

On the other hand, the AND circuit 83 produces a subtraction correction signal 43 when the polarity-judged output signal 35 changes from "1" to "0" and the output of the exclusive-NOR circuit 81 is on with a further condition that the phase signal 41 is off. A detailed description of this operation is omitted. As described above, the counter circuit 14-1 adds to or subtracts from the count number a number corresponding to an integral multiple of the reference clock period. After completion of the count correction, the counter circuit 14-1 produces a reset signal 54 to clear the flip-flop 79.

Figure 5:
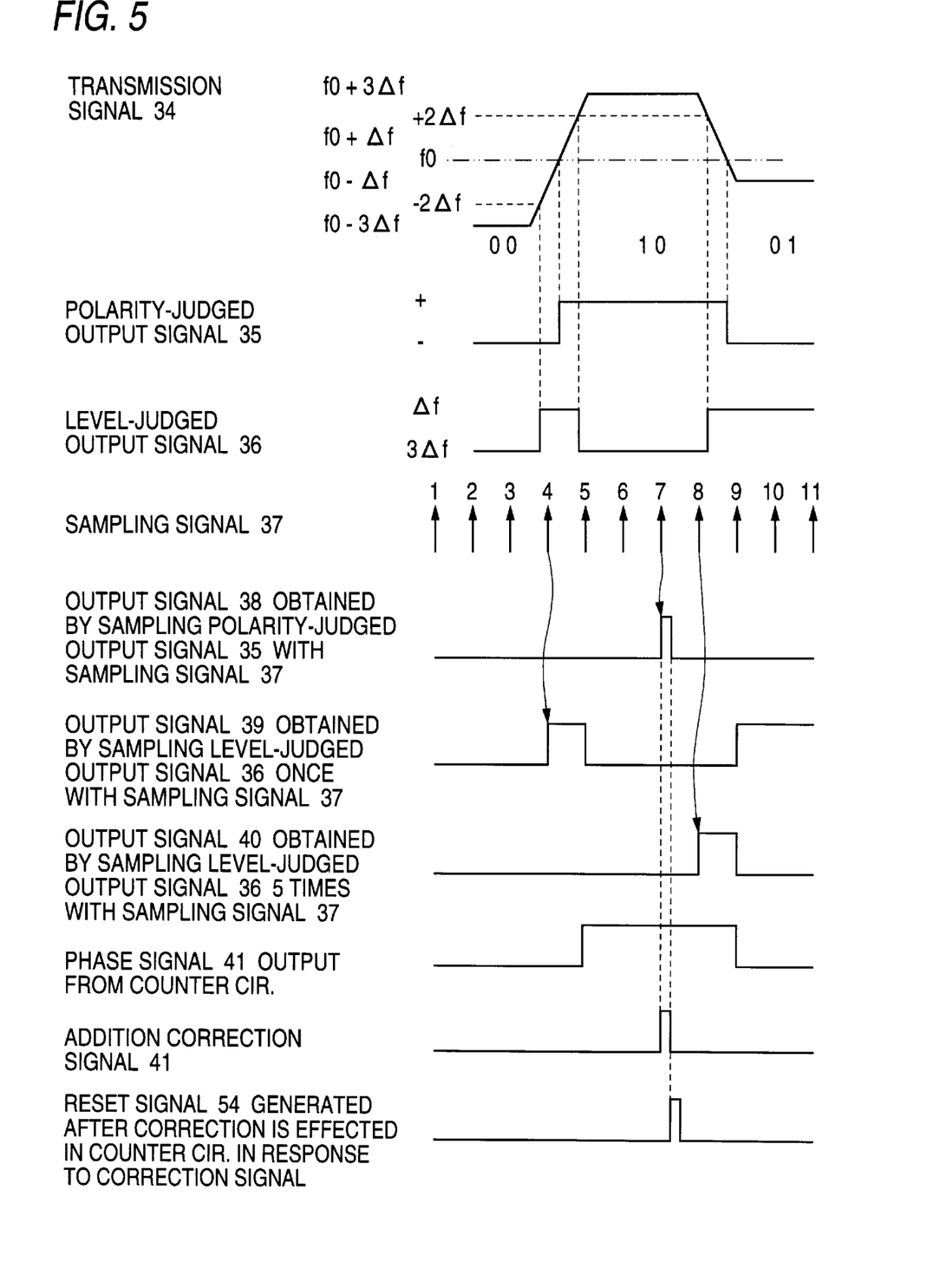
FIG. 5 is a timing chart showing an operation of the bit synchronization circuit of FIG. 4 in a case where a correction signal is supplied to a counter circuit.

The operation of the bit-synchronization circuit 15 of FIG. 5 is summarized as follows. Bit synchronization is effected correctly in such a manner that when it is detected that the polarity-judged output signal 35 has changed from "0" to "1" or "1" to "0" based on turning on of the output signal 38 obtained by sampling the polarity-judged output signal 35 with the sampling signal 37 having a rate 4 or 5 times higher than the transmission rate, the addition correction signal 42 or the subtraction correction signal 43 is produced by referring to the phase signal 41 only if both of the output signals 39 and 40 (i.e., inputs of the exclusive-NOR circuit 81), which are obtained by sampling the level-judged output signal 36 at time points separated from each other by a time corresponding to the half symbol length (in the case of 4-value FSK) or the half bit length (in the case of 2-value FSK) of the transmission signal 34, are "0" or "1."

Next, with reference to FIGS. 4 and 6, a description will be made of an example in which the bit synchronization circuit 15 of the second embodiment does not generate a correction signal. When a transmission signal 44 (see FIG. 6) varies from "00", to "10," a polarity-judged output signal 45 is changed from "−" to "+" at a time point when the transmission signal 44 crosses level f0, which is deviated from the time point to effect bit synchronization (center of the varying portion of the waveform). Since there also occurs a deviation from the time point to effect correction, a correction should not be output.

In the above situation, a level-judged output signal 46 rises from $3\Delta f$ to $\Delta f$ when the transmission signal 44 crosses level $f0-2\Delta f$. An output signal 48 obtained by sampling the polarity-judged output signal 45 with a sampling signal 47 is kept on only during one sampling period after the third sampling pulse (the seventh one among the sampling pulses shown in FIG. 6) as counted from the first one. As in the case of FIG. 5, output signals 49 and 50 obtained by sampling the level-judged output signal 46 with the sampling signal 47 once and five times, respectively, are turned on by the fourth and eighth sampling pulses (among the sampling pulses shown in FIG. 6), respectively.

Since the transmission signal 44 does not cross levels $f0\pm2\Delta f$ after it has risen from level $f0-3\Delta f$ to $f0+\Delta f$, the level-judged output signal 46 is left at level $\Delta f$. Therefore, at the time point when the output signal 48 is turned on, the output of the exclusive-NOR circuit 81 is off, as a result of which neither AND circuits 82 and 83 output a correction signal 51.

Figure 6:
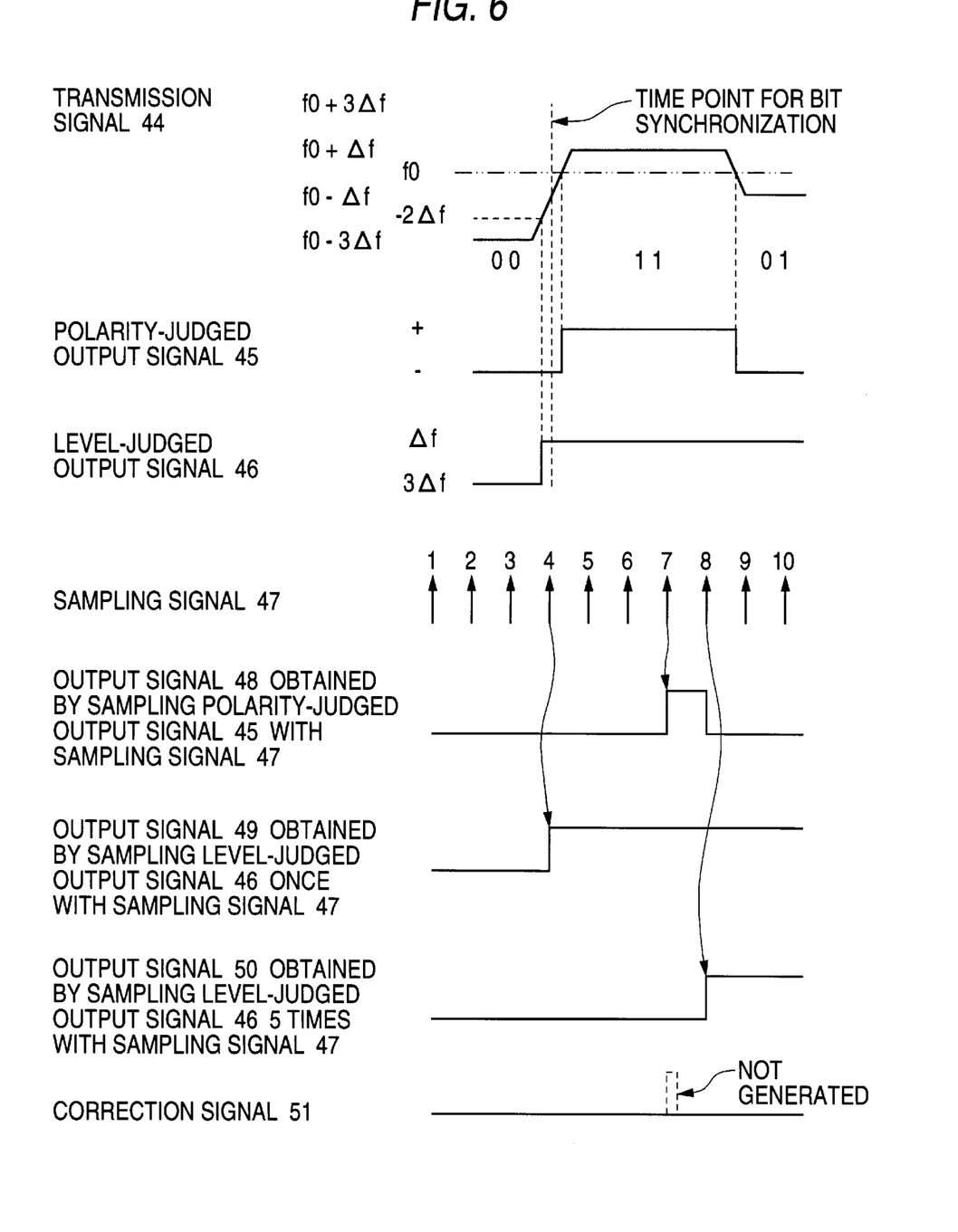
FIG. 6 is a timing chart showing an operation of the bit synchronization circuit of FIG. 4 in a case where a correction signal is not supplied to a counter circuit.

The operation of the bit synchronization circuit 15 receiving the transmission signal 44 shown in FIG. 6 is summarized as follows. When it is detected that the polarity-judged output signal 45 has changed from "0" to "1" or "1" to "0" based on turning on of the output signal 48 obtained by sampling the polarity-judged output signal 45 with the sampling signal 47 having a rate 4 or 5 times higher than the transmission rate, neither an addition correction signal nor a subtraction correction signal is produced without the need of referring to the phase signal 51 because the output signals 49 and 50 (i.e., inputs of the exclusive-NOR circuit 81), which are obtained by sampling the level-judged output signal 46 at time points separated from each other by a time corresponding to the half symbol length (in the case of 4-value FSK) or the half bit length (in the case of 2-value FSK) of the transmission signal 44, have different levels (0, 1) or (1, 0).

As is understood from the above description, when a 2-value FSK or 4-value FSK transmission signal is received, the bit synchronization circuit 15 of the second embodiment performs bit synchronization only in a situation that it can be effected correctly. In a situation that bit synchronization cannot be effected correctly (i.e., a deviation would occur in bit synchronization), it is not performed to prevent erroneous synchronization. The selective calling receiver operates properly by performing bit synchronization only when it can be effected correctly; it is not necessary to perform bit synchronization when it cannot be effected correctly.

Figure 4:
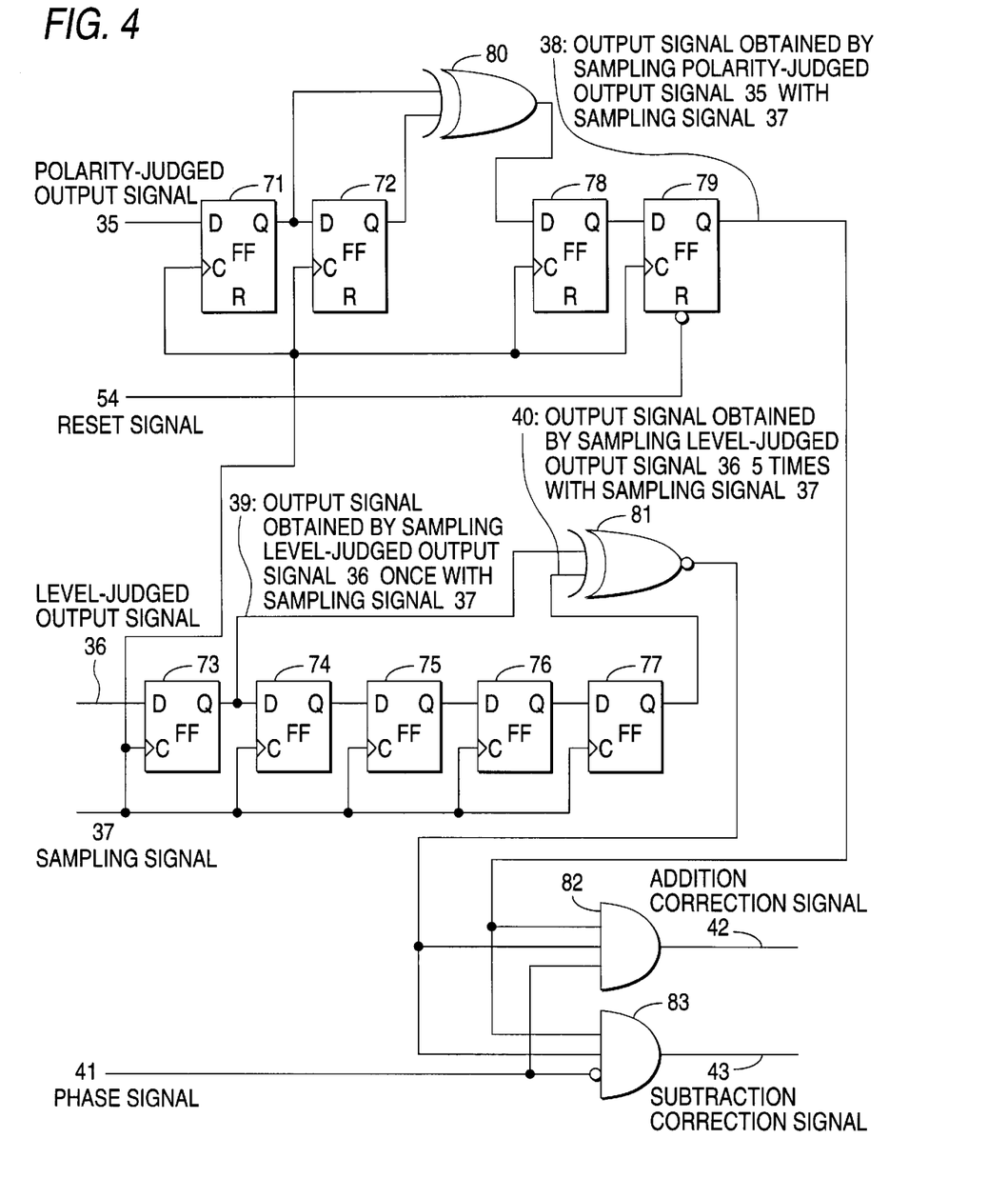
FIG. 4 is a block diagram showing a detailed configuration of a bit synchronization circuit according to a second embodiment of the invention which is directed to a case of receiving a 4-value FSK transmission signal.

The signals 45–50 shown in FIG. 6 are equivalent to the signals 35–40 shown in FIGS. 4 and 5, respectively. Although the description of the bit synchronization circuit 15 with reference to FIGS. 4–6 is directed to the case where a transmission signal is modulated-according to 4-value FSK, the bit synchronization circuit can perform bit synchronization on a transmission signal modulated according to 2-value FSK in a similar manner.

Figure 2:
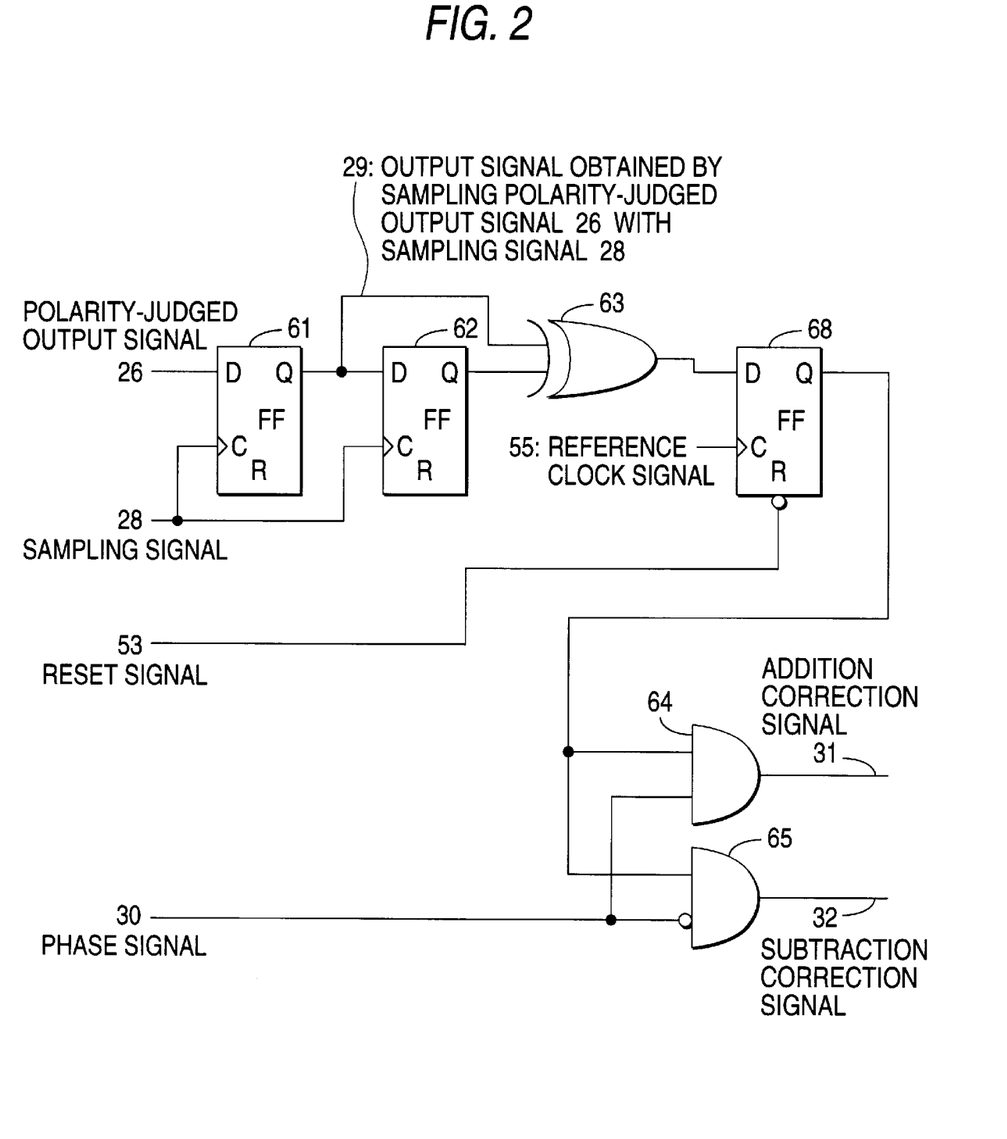
FIG. 2 is a block diagram showing a detailed configuration of a bit synchronization circuit according to a first embodiment of the invention which is directed to a case of receiving a 2-value FSK transmission signal.

Although not shown in the figures, it is possible to selectively receive a 2-value FSK transmission signal and a 4-value FSK transmission signal by switching between the bit synchronization circuits of FIGS. 2 and 4 by judging which type of transmission signal has been received. Alternatively, only the bit synchronization circuit of FIG. 4 may be provided in which case when it is judged that a 2-value FSK signal has been received, a level-judged output signal is disabled from being input to the flip-flop 73 and switching is so made that an output of the exclusive-OR circuit 80 is directly supplied to the AND circuits 82 and 83.

In the bit synchronization circuit of the invention, for a transmission signal modulated according to 2-value FSK, the count of the counter circuit is increased or decreased based on detection of a variation in the state of only the polarity-judged output signal. For a transmission signal modulated according to 4-value FSK, the count of the counter circuit is increased or decreased only when two level-judged output signals that are advanced and delayed, respectively, by a half symbol length from a time point when a variation in the state of the polarity-judged output signal is sampled are both "0" or "1." As a result, correct bit synchronization can always be effected on the received transmission signal.

What is claimed is:

1. A bit synchronization method comprising the steps of:

receiving a polarity-judged output signal obtained by detecting polarity variations of a demodulation signal obtained by demodulating a transmission signal that is modulated according to 2-value FSK or 4-value FSK and a level-judged output signal obtained by detecting level variations of the demodulating signal;

generating a first sampling output by sampling and delaying a state variation of the polarity-judged output signal with a sampling signal;

generating a phase signal indicating a period during which a count of a counter circuit needs to be corrected;

generating, when levels of the first sampling output and the phase signal satisfy a given relationship, a correction signal indicating that the count of the counter circuit should be corrected; and in response to the correction signal, adding to or subtracting from the count of the counter circuit a number corresponding to an integral multiple of a reference clock period so that a clock signal that is output from the counter circuit has a rate equal to a transmission rate of the transmission signal.

2. A bit synchronization method comprising the steps of:

receiving a polarity-judged output signal obtained by detecting polarity variations of a demodulation signal obtained by demodulating a transmission signal that is modulated according to 2-value FSK or 4-value FSK and a level-judged output signal obtained by detecting level variations of the demodulating signal;

generating a first sampling output by sampling and delaying a state variation of the polarity-judged output signal;

generating a phase signal indicating a period during which a count of a counter circuit needs to be corrected;

generating, when levels of the first sampling output and the phase signal satisfy a given relationship, a correction signal indicating that the count of the counter circuit should be corrected; and in response to the correction signal, adding to or subtracting from the count of the counter circuit a number corresponding to an integral multiple of a reference clock period so that a clock signal that is output from the counter circuit has a rate equal to a transmission rate of the transmission signal;

wherein the phase signal includes an on-period during which the count of the counter circuit needs to be increased and an off-period during which the count of the counter circuit needs to be decreased, and wherein an addition correction signal is generated when the first sampling output turns on in the on-period of the phase signal, and a substraction correction signal is generated when the first sampling output turns on in the off-period of the phase signal.

3. A bit synchronization method comprising the steps of:

receiving a polarity-judged output signal obtained by detecting polarity variations of a demodulation signal obtained by demodulating a transmission signal that is modulated according to 2-value FSK or 4-value FSK and a level-judged output signal obtained by detecting level variations of the demodulation signal;

generating a second sampling output by sampling and delaying a state variation of the polarity-judged output signal;

generating a third sampling output having a given temporal relationship with the second sampling output by sampling and delaying a state variation of the level-judged output signal;

generating a phase signal indicating a period during which a count of a counter circuit needs to be corrected;

generating, when levels of the second sampling output, the third sampling output, and the phase signal satisfy a given relationship, a correction signal indicating that the count of the counter circuit should be corrected; and in response to the correction signal, adding to or subtracting from the count of the counter circuit a number corresponding to an integral multiple of a reference clock period so that a clock signal that is output from the counter circuit has a rate equal to a transmission rate of the transmission signal.

4. The bit synchronization method according to claim 3, wherein the given temporal relationship is such that the second sampling output is generated at a time point when a time corresponding to a half symbol length or a half bit length has elapsed from sampling of the state variation of the level-judged output signal, and that the third sampling output is generated at a time point when the time corresponding to the half symbol length or the half bit length has elapsed from generation of the second sampling output.

5. The bit synchronization method according to claim 3, wherein the third sampling output is turned on only when both of an output obtained by first sampling the state variation of the level-judged output signal and an output obtained by delaying the output obtained by first sampling the state variation of the level-judged output signal by a half symbol length or a half bit length are 1 or 0.

6. The bit synchronization method according to claim 3, wherein the phase signal indicates a period during which the count of the counter circuit needs to be increased and a period during which the count of the counting circuit needs to be decreased, and wherein an addition correction signal is generated if the phase signal is on when both of the second and third sampling outputs are on, and a subtraction correction signal is generated if the phase signal is off when both of the second and third sampling outputs are on.

7. The bit synchronization method according to claim 3, wherein if the third sampling output is off when the second sampling output turns on, the correction signal is prohibited from being output, to prevent an erroneous bit synchronization correction in the counter circuit.

8. The bit synchronization method according to claim 3, further comprising the steps of:

judging whether the transmission signal is a 2-value FSK transmission signal or a 4-value FSK transmission signal; and disabling the level-judged output signal when the 2-value FSK transmission signal is received, whereby the 2-value FSK transmission signal and the 4-value FSK transmission signal are selectively subjected to bit synchronization.

9. The bit synchronization method according to claim 8, wherein the phase signal indicates a period during which the count of the counter circuit needs to be increased and a period during which the count of the counting circuit needs to be decreased, and wherein an addition correction signal is generated if the phase signal is on when the second sampling output turns on, and a subtraction correction signal is generated if the phase signal is off when the second sampling output turns on.

10. A bit synchronization circuit which receives a polarity-judged output signal obtained by detecting polarity variations of a demodulation signal obtained by demodulating a transmission signal that is modulated according to 2-value FSK or 4-value FSK and a level-judged output signal obtained by detecting level variations of the demodulation signal, said bit synchronization circuit comprising:

means for generating a second sampling output by sampling and delaying a state variation of the polarity-judged output signal;

means for generating a third sampling output having a given temporal relationship with the second sampling output by sampling and delaying a state variation of the level-judged output signal;

a counter circuit for counting reference clocks to produce a clock signal;

means for generating a phase signal indicating a period during which a count of the counter circuit needs to be corrected;

means for generating, when levels of the second sampling output, the third sampling output, and the phase signal satisfy a given relationship, a correction signal indicating that the count of the counter circuit should be corrected; and means, responsive to the correction signal, for adding to or subtracting from the count of the counter circuit a number corresponding to an integral multiple of a period of the reference clocks so that the clock signal has a rate equal to a transmission rate of the transmission signal.

11. The bit synchronization circuit according to claim 10, wherein the means for generating the second sampling output includes plural stages of flip-flop circuits and an exclusive-OR circuit, and the means for generating the third sampling output includes plural stages of flip-flop circuits and an exclusive-NOR circuit.

12. The bit synchronization circuit according to claim 10, wherein the means for generating the correction signal does not generate the correction signal if the third sampling output is off when the second sampling output turns on, to prevent an erroneous bit synchronization correction with the counter circuit.

13. The bit synchronization circuit according to claim 10, further comprising:

means for judging whether the transmission signal is a 2-value FSK transmission signal or a 4-value FSK transmission signal; and means for disabling the level-judged output signal when the 2-value FSK transmission signal is received, whereby the 2-value FSK transmission signal and the 4-value FSK transmission signal are selectively subjected to bit synchronization.

14. A selective calling receiver comprising:

an antenna for receiving a transmission signal modulated according to 2-value FSK or 4-value FSK;

a demodulation section for demodulating the received transmission signal to produce a demodulation signal;

a decoder for decoding the demodulation signal to extract transmission data, the decoder including the bit synchronization circuit according to claim 10;

a memory element for storing a calling number of the selective calling receiver;

a display device for displaying necessary information;

a speaker for generating a singing for calling notification; and a CPU for controlling the demodulation section, the decoder, the memory element, and the display device.

* * * * *